US007414236B2

(12) United States Patent
Wipiejewski

(10) Patent No.: US 7,414,236 B2
(45) Date of Patent: Aug. 19, 2008

(54) MONITORING DEVICES AND INTRUSION SURVEILLANCE DEVICES

(75) Inventor: Torsten Wipiejewski, Hong Kong SAR (CN)

(73) Assignee: Hong Kong Applied Science and Technology Research Institute Co., Ltd., New Territories, Hong Kong SAR (CN)

( * ) Notice: Subject to any disclaimer, the term of this patent is extended or adjusted under 35 U.S.C. 154(b) by 0 days.

(21) Appl. No.: 11/453,828

(22) Filed: Jun. 16, 2006

(65) Prior Publication Data

US 2007/0290122 A1 Dec. 20, 2007

(51) Int. Cl.

| | |
|---|---|
| ***G06M 7/00*** | (2006.01) |
| ***H01J 40/14*** | (2006.01) |
| ***G08B 1/08*** | (2006.01) |
| ***G08B 13/18*** | (2006.01) |
| ***H04Q 7/00*** | (2006.01) |

(52) U.S. Cl. .................... 250/221; 340/539.31; 340/555

(58) Field of Classification Search ................. 250/221, 250/349, 216, 214 AL, 338.1, 239; 340/555, 340/556, 565, 567, 539.31, 539.1, 568.2; 348/143, 163, 37

See application file for complete search history.

(56) References Cited

U.S. PATENT DOCUMENTS

| | | | | |
|---|---|---|---|---|
| 4,752,678 | A | | 6/1988 | Rikuna |
| 5,942,976 | A | * | 8/1999 | Wieser et al. ............... 340/565 |
| 5,986,253 | A | * | 11/1999 | Tabata ..................... 250/208.1 |
| 6,469,625 | B1 | | 10/2002 | Tomooka |
| 6,529,129 | B1 | | 3/2003 | Tomooka |
| 2005/0030180 | A1 | | 2/2005 | Pantus et al. |
| 2006/0071150 | A1 | * | 4/2006 | Aizpuru .................. 250/214.1 |

FOREIGN PATENT DOCUMENTS

| | | |
|---|---|---|
| CN | 2676313 | 2/2005 |
| CN | 1716327 | 1/2006 |
| EP | 0 499 177 | 8/1992 |
| EP | 0 507 025 | 10/1992 |
| EP | 0 772 171 | 5/1997 |
| EP | 1 594 099 | 11/2005 |
| JP | 2001-330683 | 11/2001 |
| WO | WO 2007/000187 | 1/2007 |

OTHER PUBLICATIONS

International Search Report Application No. PCT/CN2007/001711 dated Sep. 6, 2007.

* cited by examiner

*Primary Examiner*—Georgia Y. Epps
*Assistant Examiner*—Jennifer Bennett
(74) *Attorney, Agent, or Firm*—Buchanan Ingersoll & Rooney PC

(57) ABSTRACT

A security surveillance device that includes an electromagnetic wave sensor for sensing an electromagnetic wave of an external electromagnetic wave source and an anti-tampering arrangement. The anti-tampering arrangement includes a detection window forming a partition between the external electromagnetic wave source and the electromagnetic wave sensor, the detection window includes an outer corrugated surface facing the electromagnetic wave source; an optical arrangement for deploying an optical surveillance beam which is arranged to undergo multiple reflections at the outer corrugated surface of the detection window is provided and the surveillance beam loop is monitored by a control circuitry to monitor tampering.

20 Claims, 2 Drawing Sheets

MONITORING DEVICES AND INTRUSION SURVEILLANCE DEVICES

FIELD OF THE INVENTION

This invention relates to monitoring devices and, more particularly, to monitoring devices with an infra-red detector for surveillance applications, for example, for intrusion detection. This invention also relates to surveillance devices incorporating electromagnetic sensors, such as infrared sensors.

BACKGROUND OF THE INVENTION

Monitoring devices comprising electromagnetic wave (EM-wave) sensors are particularly useful in surveillance applications. For example, intrusion detectors comprising PIR (passive infra-red) sensors are commonly deployed in homes, museums, banks, offices, and other commercial and/or industrial establishments for security surveillance. Such intrusion detectors usually operate to detect infra-red (IR) radiation radiated by a moving object and will trigger an alarm when the detected IR level exceeding a pre-determined threshold, corresponding to the detection of an approaching or intruding human being. It is known that living objects emit IR radiation at a wavelength of about 10-12 μm. The more sophisticated IR detectors are equipped with processing circuitry to distinguish between an approaching human body or other living bodies.

Intrusion monitoring devices are frequently subject to tampering by intruders. For example, intruders have been known to apply a mask of lacquer, which is opaque to IR radiation, onto the detection window of an intrusion window to cheat it. Hence, it will be beneficial if there can be provided improved EM-wave detectors, especially IR monitoring devices alleviating shortcomings of conventional devices.

SUMMARY OF THE INVENTION

Accordingly, this invention has described a monitoring device for security surveillance application, the device comprising an electromagnetic wave sensor for sensing an electromagnetic wave of an external electromagnetic wave source; a detection window for forming a partition between said external electromagnetic wave source and said electromagnetic wave sensor; and an anti-tampering arrangement comprising an optical arrangement for deploying an optical surveillance beam and control circuitry, wherein said optical surveillance beam comprises a first beam portion and a second beam portion, said first beam portion being a beam emitted by said optical arrangement towards said detection window, and said second beam portion being due to reflection of said first beam portion by said detection window; and said control circuitry is for detection of a variation of said second beam portion, wherein the variation is indicative of tampering of said detection window.

Preferably, the control circuitry also comprises means for generating an alarm signal upon detection of a variation of said second beam portion, wherein the variation of said second beam portion is indicative of tampering of said detection window.

When the detection window is tampered, for example, by applying a transparent lacquer mask which is IR shielding on the external surface of the detection window of the monitoring detector, the reflection characteristics of the detection window will be altered. For example, the percentage of partial reflection by the detection window will be changed so that the surveillance loop due to total internal reflection is disrupted.

By the deployment of such an optical surveillance beam within the monitoring device, tampering of the detection window will be readily detected by monitoring the variation in the level of the detected optical surveillance beam, which is indicative of a change in the reflection characteristics of the detection window. The control circuitry can be arranged to generate an alarm signal upon detection of an abnormal variation, especially drop, in the level of the detected surveillance beam.

As an exemplary arrangement, the control circuitry is for monitoring electrical output of the optical detector, a variation in electrical output of the optical detector is indicative of a variation in the refractive characteristics of said detection window and being indicative of tampering of said detection window.

In a preferred embodiment, the detection window is forward of the optical arrangement so that the optical arrangement comprising an optical source and an optical detector is kept behind the detection window and not accessible from the outside. Specifically, the optical source is aligned for emitting an optical surveillance beam forwardly towards the detection window and the optical detector is aligned for detecting the optical surveillance beam after it has been partially reflected upon encountering the detection window. In addition, the control circuitry is for monitoring electrical output of said optical detector.

When the detection window has been tampered by the coating or masking of a layer of lacquer or other tampering substances, the reflection characteristics of the detection window, as characterised by the percentage of partial reflection by the detection window, will be altered. As a result of the change in the reflective characteristics, the surveillance beam returning to the optical detector will be substantially reduced. Such an interruption will be detected by the control circuitry and the control circuitry will generate appropriate alarm signals to alert security.

As the optical arrangement is contained within the monitoring device, the operational characteristics of such an anti-tampering arrangement are not readily apparent to an intruder and the application of conventional masking techniques to tamper the monitoring device will not succeed.

Preferably, said detection window comprises a corrugated surface, said corrugated surface being profiled such that a surveillance beam emitted by said optical source impinging said corrugated surface is partially reflected.

Preferably, said corrugated surface comprises at least one serrated tooth; and said optical source is arranged so that said surveillance beam impinges said detection window at one sidewall of said serrated tooth and exits said detection window from another sidewall of said serrated tooth and towards said optical detector, after undergoing multiple partial reflections at said serrated tooth.

Preferably, an adjacent pair of sidewalls of said serrated tooth is at a right angle or more to each other.

In a specific example, said corrugated surface comprises a plurality of serrated teeth, said serrated teeth having a depth in the range of from 10 μm to 1 mm.

As a further example, said detection window may comprise a corrugated surface, the corrugation of said corrugated surface being profiled so that an adhesive fluid applied on said corrugated surface will upon drying have a rippled surface whereby light incident upon said corrugated surface from said optical source will emerge from said detection window after undergoing refraction through said detection. When the detection window has been tampered, a pair of adjacent surfaces of said corrugated surfaces is encapsulated by said rippled surfaces of dried adhesive fluid. A transparent lacquer is a commonly known example of an adhesive tampering fluid. As an example, said detection window is formed from a polypropylene material.

For intrusion applications, infra-red radiation is commonly the electromagnetic wave being monitored. Generally speaking, said light source, said optical detector and said window are arranged to form a security detection loop for monitoring tampering of said detection window, said security detection loop being interrupted when the reflection characteristics of the window are modified and an alarm signal representing tampering is generated upon detection of a change of reflection characteristics of said detection window above a threshold.

BRIEF DESCRIPTION OF THE DRAWINGS

Preferred embodiments of the present invention will be explained in further detail below by way of example and with reference to the accompanying drawings, in which.

DETAILED DESCRIPTION OF THE PREFERRED EMBODIMENTS

Figure 1:
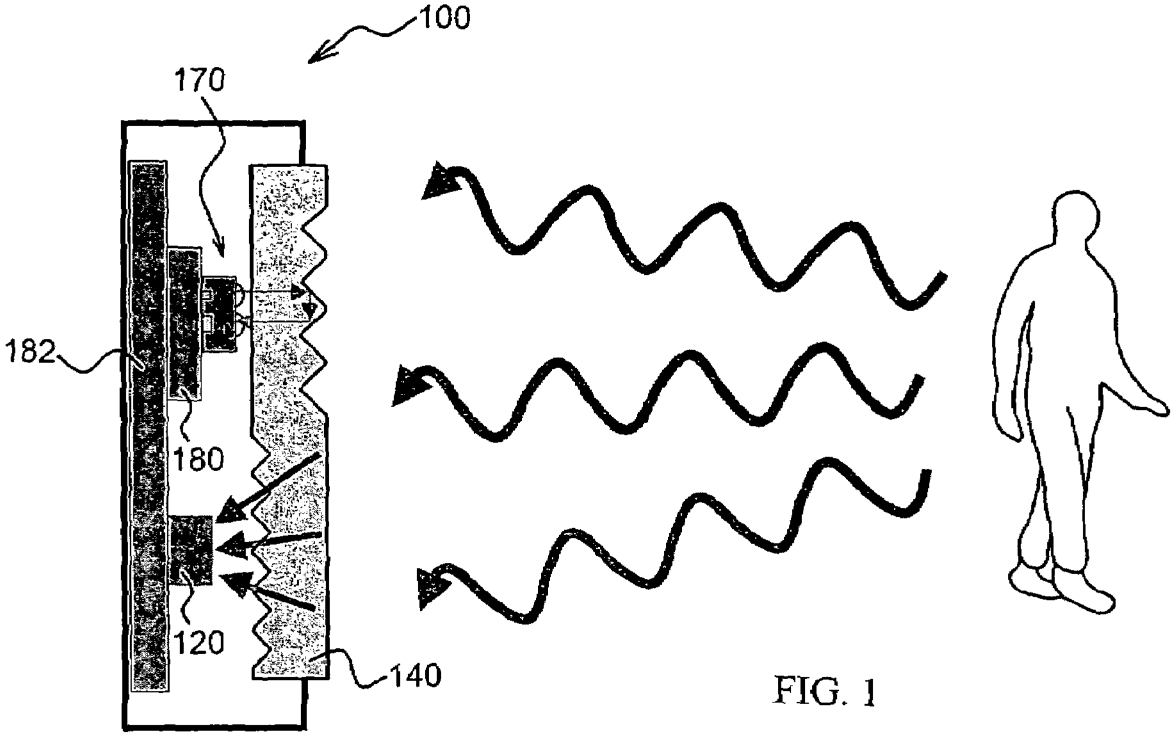
FIG. 1 is a schematic diagram showing a first preferred embodiment of this invention.
Figure 1A:
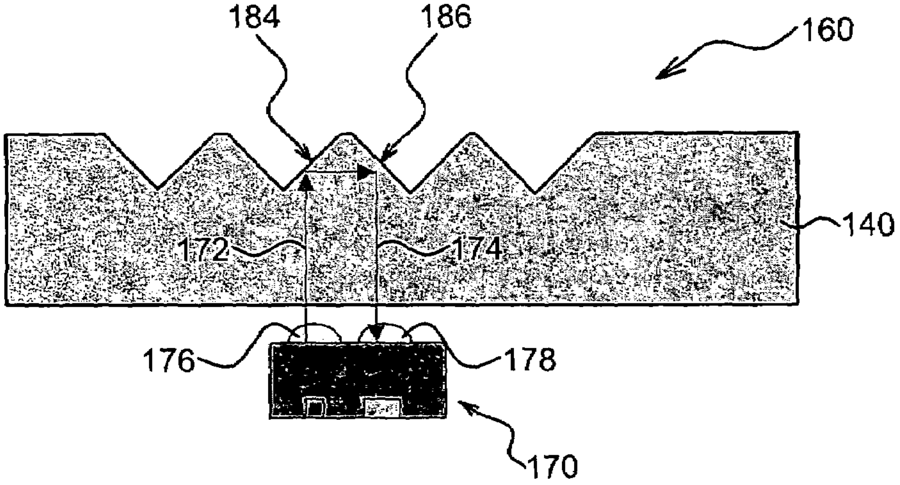
FIG. 1A shows an enlarged view of the optical arrangement of the monitoring device of FIG. 1.

Referring to the monitoring device of FIGS. 1 and 1A, the monitoring device 100 comprises an electromagnetic wave sensor 120, a detection window 140 and an anti-tampering arrangement 160.

The electromagnetic wave sensor is for sensing an electromagnetic wave of an external electromagnetic wave source, for example, a moving human body. The detection window 140 is for forming a partition between the external electromagnetic wave source and the electromagnetic wave sensor.

The anti-tampering arrangement comprises an optical arrangement 170 for deploying an optical surveillance beam and control circuitry. The optical surveillance beam comprises a first beam portion 172 and a second beam portion 174. The first beam portion is an optical beam emitted by the optical arrangement towards the detection window and the second optical beam portion is due to reflection of the first beam portion by the detection window.

More specifically, the optical arrangement comprises an optical source 176 which is aligned for emitting an optical surveillance beam towards the detection window and an optical detector 178 which is aligned for detecting the surveillance beam after being reflected at the detection window.

To form a complete security detection loop comprising the optical surveillance beam and the optical arrangement, the detection window, at least the portion of the detection window which is involved with the optical arrangement and forming part of a security detection loop, is transparent to the optical surveillance beam. Because the detection window is transparent to the optical surveillance beam, a substantial portion of the first beam portion will pass through the detection window to the outside while a small portion of the first beam portion will be partially reflected and becomes the second beam portion. Although the external medium is air in this example, the external medium can be water for an underwater monitoring system or other fluid.

The control circuitry comprises electronic circuitry 180 for monitoring detection of the optical surveillance beam, especially the second beam portion, and for sending out an alarm signal upon detection of a variation of the second beam portion indicative of tampering of the detection window. The exemplary control circuitry of FIG. 1 is for monitoring electrical output of the optical detector. A variation in the electrical output of the optical detector will be indicative of a variation in the intensity of the detected surveillance beam. Such a variation in turn indicates tampering of the detection window, since tampering of the detection window by the application of a transparent coating substance on the external surface of the detecting window will change its reflection characteristics, as will be explained below.

A variation in the detected optical surveillance beam will be indicative that the security detection loop has been broken, interrupted or weakened. As a result, the control circuitry will generate an alarm for alert. The control circuitry also comprises circuitry for controlling the operation of the optical source, for example, for setting the operating point of a laser source, in order to control the intensity or modulation of the optical surveillance beam emitted by the optical source. The control circuitry further comprises processing circuitry to process the electrical output of the optical detector in order to enable the control circuitry to compare the level of incident beam in a normal, un-tampered situation, to a level corresponding to an abnormal, tampered, situation. In the specific example, the optical arrangement and the control circuitry are mounted on a single printed circuit board (PCB) 182 and are enclosed within a housing with the detection window providing interfacing between the external medium and the optical arrangement. Containing the security detection loop within an enclosure mitigates the risks of direct tampering of the security loop. More specifically, the optical arrangement is placed behind the detection window so that the detection window is intermediate an external electromagnetic wave source and the optical arrangement.

The electromagnetic wave sensor is located behind the detection window so that it can detect electromagnetic wave emanated by an external electromagnetic wave source in front of the detection window. More specifically, the electromagnetic wave sensor comprises a PIR detector for detecting infrared radiation emanating from an object. The PIR sensor is placed behind the window for monitoring an external IR source which is in a line of sight relationship with the PIR sensor. The detection window is transparent to both the optical surveillance beam and the electromagnetic wave being monitored. However, as the different portions of the detection window serve different purposes, the detection window can have a split optical characteristic. For example, the portion of the detection window which forms part of the security detection loop with the optical arrangement can be transparent to the optical surveillance beam while it could be opaque to the electromagnetic wave being monitored. On the other hand, the portion of the detection window which is opposite the PIR sensor needs to be transparent to the EM wave being monitored but could be opaque to the optical surveillance beam.

In the specific example of FIG. 1, the optical source 176 is a laser source and the detection window is made of polypropylene which is transparent to both the laser surveillance beam and the IR radiation beam being monitored. The portion of the detection window forming part of the security detection loop is profiled with a corrugated surface facing the external medium. The arrangement of the optical source and the corrugated surface is such that the first beam portion emitted by the optical source will be incident on the corrugated surface and partially reflected towards the optical detector. More specifically, a first beam portion of the optical surveillance beam is partially reflected towards a second sidewall of a corrugation when the first beam portion is incident on a first sidewall of the corrugation of the corrugated detection window. A substantial portion of the optical surveillance beam will exit through the detection window. The partially reflected optical surveillance beam upon impinging on the second sidewall of the corrugation will move towards the optical detector. As a convenient example, the first and the second sidewalls are at a right angle. The optical source is aligned so that the optical surveillance beam is incident and reflected at 45° to an axis orthogonal to the plane of incidence. As an alternative, the detection window may have a serrated tooth having a first sidewall 184 and a second sidewall 186 to effect the reflections or partial reflections.

The portion of the detection window which is opposite the PIR sensor is made as a Fresnel lens so that IR radiation from an external source is collected and focused onto the PIR detector. The optical source in this example comprises a VCSEL (Vertical-Cavity Surface-Emitter Laser) laser source as a convenient example.

During normal surveillance operation, the optical source will generate an optical surveillance beam. The optical surveillance beam is incident upon the detection window so that the optical surveillance beam is partially reflected towards the optical detector, whereby a security detection loop-is maintained. The control circuitry monitors the level of the optical surveillance beam being detected by the optical detector so that, upon detection of a drop of the detected optical surveillance beam below a threshold level, an alarm will be triggered. As the level of the incident optical surveillance beam will be represented by the electrical output of the optical detector, the control circuitry can, by monitoring the electrical output of the detector, monitor the variation in the level of the incoming optical surveillance beam.

Figure 2:
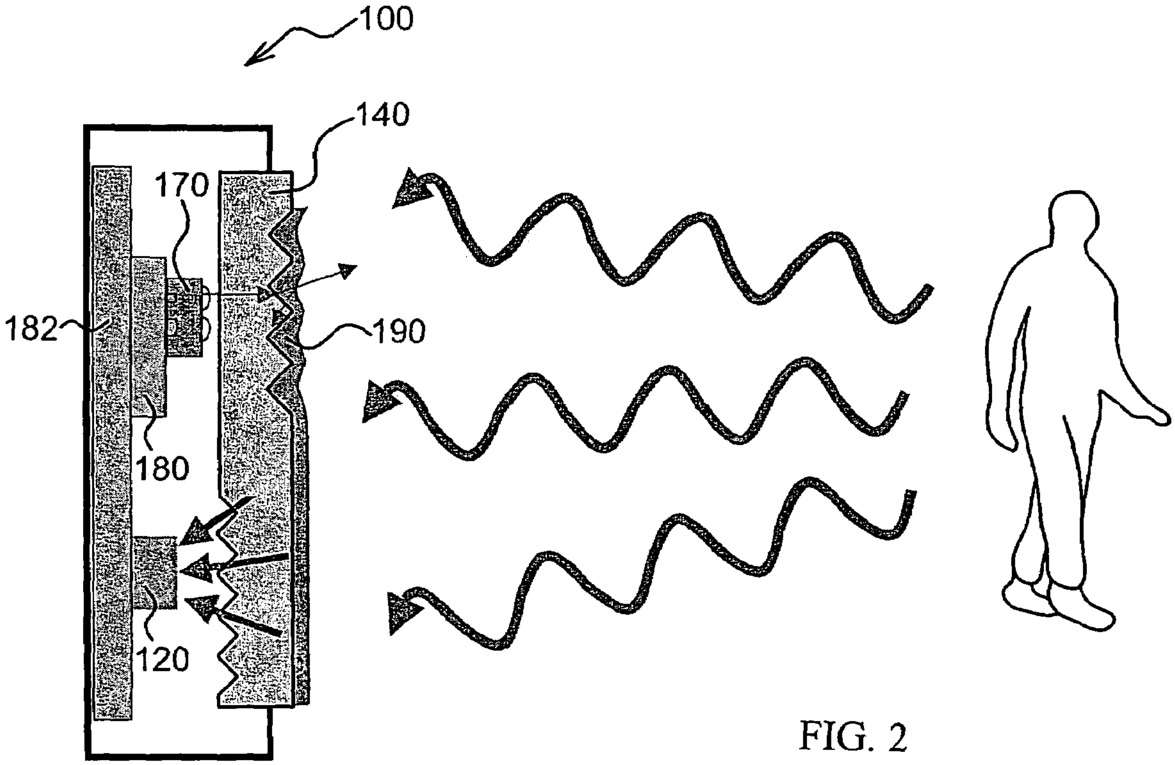
FIG. 2 is a schematic diagram illustrating a monitoring device of FIG. 1 tampered by application of an IR opaque coating on an external surface of the detection window.

When the detection window has been tampered, as shown in FIG. 2, the reflection characteristics of the detection window are changed. More particularly, when a tampering substance is applied on the corrugated surface, a tampering layer which is opaque to the EM-waves being detected but which is substantially transparent to the optical surveillance beam will be formed. This tampering layer, due to the corrugation, will have a rippled surface. The surface ripples will change the reflection path of the second beam portion. As a result, the incident optical surveillance beam is no longer returned towards the optical detector. As a further result, the level of the optical surveillance beam being returned to the optical detector will drop below a threshold value, indicating that the detection window has been tampered. Upon detection of such a variation, the control circuitry will generate an alarm signal for further processing.

Figure 2A:
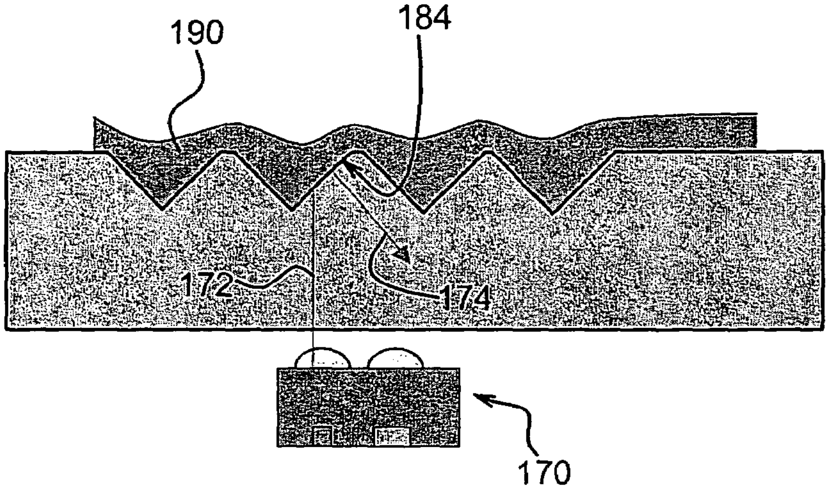
FIG. 2A shows an enlarged view of the optical arrangement of the monitoring device of FIG. 1 with the detection being tampered.

Referring more particularly to FIGS. 2 and 2A, when a tampering fluid has been applied onto the surface of the detection window, the surface tension of the tampering fluid will cause the tampering fluid to smoothen out and form a rippled surface 190. In many instances, this rippled surface 190 is transparent to the optical surveillance beam upon drying. The formation of such a rippled surface as a coating on the detection window will change the reflection characteristics of the detection window. Consequently, a noticeable portion of light of the first beam portion 172, which would have been reflected by the corrugated surface but for the tampering coating, will pass into the tampering layer and get reflected at the interface between the tampering layer and the immediately adjacent space. As the rippled surface is smoother and somewhat rounded, the reflected beam 174 at this interface deviates from the original beam when reflected by the corrugated surface and moves away from the optical detector. The control circuitry upon detection of a change, which is a reduction in this example, of the detected optical signal, will trigger an alarm signal, for example, to indicate intrusion. A transparent lacquer is an example of a commonly known tampering fluid.

In a second preferred embodiment of this invention, the detection window, or at least the portion of the detection window which forms part of the security detection loop, has the effect of a one-sided mirror so that a substantial portion of the optical surveillance beam will be reflected by the detection window, and more particularly by the corrugated surface. The reflected beam will be subsequently reflected back towards the optical detector. More particularly, the detection window of this second preferred embodiment is made of a substance which operates as an one-sided mirror so that an external electromagnetic wave can substantially pass through the detection window and moves towards the PIR detector while a substantial portion of the optical surveillance beam will be reflected back towards the optical arrangement. When a layer of a tampering substance is applied onto the detection window, the one-sided mirror effect of the detection window will be modified, as a result, the percentage of the optical surveillance beam being reflected back towards the optical detector will be reduced. Upon detection of a drop of the returned optical surveillance below a threshold level, the control circuitry can generate an alarm signal for an alert without loss of generality.

While the present invention has been explained by reference to the examples or preferred embodiments described above, it will be appreciated that those are examples to assist understanding of the present invention and are not meant to be restrictive. Variations or modifications which are obvious or trivial to persons skilled in the art, as well as improvements made thereon, should be considered as equivalents of this invention.

Furthermore, while the present invention has been explained by reference to an intrusion detector comprising a PIR sensor, it should be appreciated that the invention can apply, whether with or without modification, to other monitoring devices with other EM-wave sensors without loss of generality.

The invention claimed is:

1. A security surveillance device comprising:

an electromagnetic wave sensor for sensing an electromagnetic wave of an external electromagnetic wave source; and an anti-tampering arrangement comprising:

a detection window forming a partition between said external electromagnetic wave source and said electromagnetic wave sensor, said detection window comprising an outer corrugated surface facing said electromagnetic wave source;

an optical arrangement for deploying an optical surveillance beam wherein optical surveillance beam comprises a first beam portion and a second beam portion, said first beam portion being a beam emitted by said optical arrangement towards said detection window, and said second beam portion being due to multiple reflections of said first beam portion at said outer corrugated surface of said detection window; and control circuitry for detection of a variation of said second beam portion, wherein the variation of said second beam portion is indicative of tampering of said detection window, said control circuitry generating an alarm signal upon detection of a variation of said second beam portion, wherein said second beam portion is a partial reflection of said first beam portion and wherein said outer corrugated surface is profiled with at least a pair of side walls such that a surveillance beam emitted by said optical source impinging upon said corrugated surface is partially reflected by said pair of side walls.

2. A surveillance device according to claim 1, wherein said detection window is positioned forward of said optical arrangement; said optical arrangement comprises an optical source aligned for emitting an optical surveillance beam forwardly towards the outer corrugated surface of said detection window, and an optical detector aligned for detecting said surveillance beam after undergoing multiple partial reflection at said detection window; and wherein said control circuitry is for monitoring electrical output of said optical detector, wherein a variation in an electrical output of said optical detector is indicative of a variation in the optical reflection characteristics of said detection window and indicative of tampering of said detection window.

3. A surveillance device according to claim 1, wherein said optical source, said detection window and said optical detector are arranged whereby an optical surveillance beam emitted by said optical source is diverted towards said optical detector by multiple partial reflection at said detection window.

4. A surveillance device according to claim 1, wherein said control circuitry comprises control means for monitoring electrical output from said optical detector, said control means generating an alarm signal when electrical output of said optical detector exceeds a predetermined threshold level.

5. A surveillance device according to claim 1, wherein said detection window is formed of a material which is transparent to both said electromagnetic wave and said optical surveillance beam.

6. A surveillance device according to claim 1, wherein said electromagnetic wave is infrared and the electromagnetic wave sensor comprising a passive infrared sensor.

7. A surveillance device according to claim 1, wherein said optical source comprises a laser transmitter for emitting a laser surveillance beam and the optical detector comprises a photo-detector for detecting said laser surveillance beam.

8. A surveillance device according to claim 7, wherein said laser transmitter comprises a VCSEL source.

9. A surveillance device according to claim 1, wherein said outer corrugated surface comprises at least one serrated tooth defining said pair of side wells; and said optical source is arranged so that said surveillance beam impinges said detection window at one sidewall of said serrated tooth and exits said detection window from another sidewall of said serrated tooth and towards said optical detector, after undergoing multiple partial reflections at said serrated tooth.

10. A surveillance device according to claim 9, wherein an adjacent pair of sidewalls of said serrated tooth is at a right angle or more to each other.

11. A surveillance device according to claim 1, wherein said corrugated surface comprises a plurality of serrated teeth, said serrated teeth having a depth in the range of from 10 μm to 1 mm.

12. A surveillance device according to claim 1, wherein said outer corrugated surface being profiled so that an adhesive fluid applied on said corrugated surface will upon drying form a rippled surface whereby light incident upon said corrugated surface from said optical source will emerge from the outside of said detection window.

13. A surveillance device according to claim 12, wherein a pair of adjacent surfaces of said corrugated surfaces is encapsulated by said rippled surfaces of dried adhesive fluid when said detection window is tampered.

14. A surveillance device according to claim 12, wherein said adhesive fluid is transparent to said optical surveillance beam.

15. A surveillance device according to claim 14, wherein said adhesive fluid is a transparent lacquer.

16. A surveillance device according to claim 1, wherein said detection window is formed from a polypropylene material.

17. A surveillance device according to claim 1, wherein the electromagnetic wave being monitored is infrared radiation.

18. A surveillance device according to claim 1, wherein said light source, said optical detector and said window are arranged to form a security detection loop for monitoring tampering of said detection window, said security detection loop being interrupted when the reflection characteristics of the window are modified and an alarm signal representing tampering is generated upon detection of a change of reflection characteristics of said detection window above a threshold.

19. A surveillance device according to claim 14, wherein the window is further transparent to the electromagnetic wave to be detected.

20. An intrusion detector comprising a security surveillance device of claim 1.

* * * * *